3,216,977
ANIONIC POLYMERIZATION OF LACTAMS WITH METHYLENE OXAZOLIDINE-4,5-DIONE COMPOUNDS AS ACTIVATORS

Harold G. Brouns, Woodbury, N.J., assignor to E. I. du Pont de Nemours and Company, Wilmington, Del., a corporation of Delaware
No Drawing. Filed Dec. 13, 1962, Ser. No. 244,263
11 Claims. (Cl. 260—78)

This invention relates to a process, and more particularly to an improved process for converting lactams to polyamides.

The polymerization of caprolactam to give a polyamide, 6 nylon, has been known for many years. The earliest processes described for this polymerization were quite slow, requiring several hours. More recently, it has been disclosed that the base-catalyzed polymerization of caprolactam and other lactams can be made especially fast by the addition of certain cocatalysts derived from organic and inorganic acids of particular types. Particularly effective cocatalysts which have been disclosed include acylating agents and acyl compounds, for example, acyl halides, anhydrides, imides, and the like. Other classes of cocatalysts which have been disclosed include isocyanates and substituted ureas.

This invention provides an improved process for rapidly polymerizing lactams. More particularly, the process of this invention is an improvement in the process for polymerizing lactams in the presence of lactam-base salts, which improvement comprises carrying out the polymerization in the presence of a 2-substituted-methylene-3-substituted-oxazolidine-4,5-dione having the formula

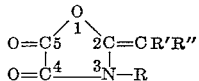

wherein R is a radical selected from the group consisting of alkyl, cycloalkyl and aryl radicals of up to 20 carbon atoms and R' and R'' are radicals of up to 20 carbons atoms selected from the group consisting of alkyl, cycloalkyl and aryl radicals and cycloalkyl radicals containing both R' and R''. Examples of R, R' and R'' substituents include aryl radicals including unsubstituted aryl radicals such as phenyl and naphthyl and substituted aryl radicals, including alkaryl and haloaryl radicals, such as tolyl, ethylphenyl, bromophenyl and chlorophenyl radicals; alkyl radicals including unsubstituted alkyl radicals such as methyl, ethyl, isopropyl, butyl, amyl, hexyl, 2-ethyl-hexyl and stearyl as well as substituted alkyl radicals, for example, aralkyl radicals such as benzyl, phenylethyl and tolylethyl radicals; and cycloalkyl radicals, both substituted and unsubstituted, such as cyclopentyl, cyclohexyl and methylcyclohexyl. As indicated hereinbefore, R' and R'' can together form a cycloalkylene radical, for example, a cyclopentamethylene radical as in the compound 2-cyclohexylidene-3-phenyl-oxazolidine-4,5-dione. R, R' and R'' are preferably hydrocarbon radicals, and because of availability those cocatalysts wherein R, R' and R'' are 1 to 5 carbon alkyl or phenyl radicals are particularly preferred.

In addition to those just indicated, examples of additional specific compounds which can be used as cocatalysts in accordance with this invention are listed in the following table wherein the R, R', and R'' substituents in the formula above are indicated:

| R | R' | R'' | R | R' | R'' |
|---|---|---|---|---|---|
| ethyl | ethyl | ethyl. | ethyl | phenyl | ethyl. |
| do | do | isopropyl. | do | do | phenyl. |
| do | do | phenyl. | do | do | benzyl. |
| do | do | benzyl. | do | do | phenethyl. |
| do | do | phenethyl. | do | do | p-bromophenyl. |
| do | n-butyl | ethyl. | | | |
| do | do | isopropyl. | phenyl | do | ethyl. |
| do | do | phenyl. | do | do | phenyl. |
| do | do | benzyl. | do | do | benzyl. |
| do | do | phenethyl. | do | do | phenethyl. |
| do | sec-amyl | ethyl. | do | do | methyl. |
| do | do | phenyl. | do | ethyl | do. |
| do | do | benzyl. | do | do | ethyl. |
| do | do | phenethyl. | tolyl | do | do. |

Relating the above table to the nomeclature and structural formula previously indicated, the compounds noted in the table are 2-diethylmethylene-3-ethyloxazolidine-4,5-dione, 2-ethylisopropylmethylene-3-ethyloxazolidine-4,5-dione, and so forth.

The oxazolidinediones of the present invention can be prepared according to the method given by Skinner and Ludwig, J. Am. Chem. Soc. 78, 4656 (1956).

The polymerization process of this invention is particularly effective in producing rapidly high molecular weight polyamides from lactams or combinations of lactams containing from 3 to 12 or more carbon atoms in the lactam ring. Such lactams include pyrrolidone, piperidione, γ- and ε-caprolactam, enantholactam, caprylolactam, and laurolactam or mixtures thereof. Generally, the anionic polymerization process can be carried out at temperatures above the melting point of the lactam monomer but below the melting point of the resulting polyamide. In general, this temperature range is from about 25° C. to about 200° C., depending on the particular lactam employed. With lactams containing less than 6 carbon atoms in the lactam ring, the preferred temperature of polymerization is below 150° C. ε-Caprolactam is readily polymerized by the process of this invention at temperatures between 100 and 200° C. with 150° C. being a convenient operating temperature.

The anionic catalysts useful in the process of this invention are prepared by the reaction of strong bases with a lactam. Generally, the lactam to be polymerized is used for the preparation of the anionic catalyst, but if desired, the anionic catalyst can be prepared from another lactam.

The strong base employed to form the anionic catalyst can be an alkali metal, an alkaline earth metal, or a strongly basic derivatives of one of these metals such as hydroxide, hydride, alkyl, aryl, alkoxide or amide. All of these bases are of the type which are strong enough to convert to its iminium salt. Thus, sodium hydroxide, potassium hydroxide, lithium hydroxide, magnesium hydroxide, calcium hydroxide, strontium hydroxide, lithium hydride, sodium hydride, sodium methyl, sodium ethyl, sodium methoxide, sodium phenyl, sodium naphthyl, sodamide, and the like are suitable bases for the preparation of the anionic catalyst. This anionic catalyst is prepared by heating the lactam with a strong base at a temperature between about 25 and 225° C. and above the melting point of the lactam. The base can be added to the total lactam which is to be polymerized or to a portion of the lactam which is to be polymerized and this portion of the lactam containing the anionic catalyst added to more of the lactam later. Essentially no polymerization occurs during the preparation of the anionic catalyst carried out between the melting point of the lactam and about 225° C.; however, if the anionic catalyst is to be held for any appreciable time, it is preferably held at a temperature below about 125° C. The time required for this step in tthe process depends upon the strength of the base employed, the proportion added, and the temperature chosen and can be from a few seconds to several hours. Preferably, the lactam should be essentially anhydrous as should the added base. Generally, the amount of base charged should be about from 0.1 to 10 mole percent based on the total lactam used in preparing the anionic catalyst and the subsequent polymerization. Proportions in the higher end of this range produce lower molecular weight polyamides and faster rates, so optimum proportions for most purposes are from about 0.2 to 5 mole percent of the strong base.

The oxazolidonedione derivatives employed as cocatalysts for this polymerization are those described above. The cocatalyst can be employed in proportions varying from about 0.05 to about 5 mole percent based on the total lactam. Preferably, the proportion of the cocatalyst is less than the proportion of the anionic catalyst and usually not more than ½ of the proportion of anionic catalyst.

The cocatalyst can be added to the lactam containing the anionic catalyst or dissolved in a separate portion of the lactam and the two portions of lactam mixed at the time the polymerization is desired. For optimum operation of the process of this invention, an inert gas such as nitrogen is bubbled through the molten lactam during the initial reaction with the basic catalyst to remove low molecular weight compounds such as water and to prevent oxidation. Alternatively, the reaction of the lactam with the basic catalyst can be carried out under reduced pressure in which case the low molecular weight compound is distilled from the lactam.

The process of this invention is useful in rapidly preparing cast articles of any size and shape from lactams. The process can be employed to obtain unusual shapes which would be difficult, if not impossible, to obtain by conventional molding of prepolymerized polycarboxylamides. The process has the advantage when used in this fashion that high temperatures and high pressures normally required in injection molding and similar processes are not necessary. Therefore, simpler lighter weight molds can be employed and faster cycles often can be obtained in the preparation of large shaped articles. The entire process can be carried out in the mold or, if desired, the lactam solution containing the anionic catalyst and a second portion of the lactam solution containing the cocatalyst can be mixed and then immediately cast into the mold by procedures similar to transfer molding to obtain the desired shaped article in any size at a very high rate. Similarly, it is possible to employ the process of this invention in many extrusion-type operations, in which the lactam containing the anionic catalyst and another portion of the lactam containing the cocatalyst are intimately mixed and then extruded under conditions which provide for obtaining an extrudate which is polymerized as it is formed.

The process of this invention is operable in the presence of various fillers, reinforcing agents, blowing agents, plasticizers, other plastics, dyes, surfactants, etc. Thus, if desired, glass mats or mats of synthetic fibers can be impregnated with the solution and rapidly cured. Similarly, finely-divided fillers can be suspended in the polymerizing mixture to obtain filled polycarboxamides. Antioxidants, colorants, and the like can also be employed. The process of this invention contemplates the use of the process under all of the above conditions. The process of this invention likewise can be carried out as a coating process in which the lactam solution containing anionic catalyst and the oxazolidone derivative cocatalyst is applied as a liquid to the surface of a web, such as paper or a textile and then permitted to polymerize to the polycarboxamides and thus form a coating of polycarboxylamide film on a substrate.

The invention is more thoroughly illustrated with the aid of the following examples. Parts and percentages where given are by weight.

*Example 1*

A mixture of 22.6 parts of caprolactam and 0.2016 part of sodium hydride is placed in a reaction vessel which is immersed in an oil bath at 150° C. Nitrogen is bubbled through the molten caprolactam at a rate of 350 ml./minute. After heating for 20 minutes, 0.3519 part of a cocatalyst, 2-diphenylmethylene - 3 - ethyloxazolidine - 4,5-dione, is added. The nitrogen bubbling is continued for about 15–30 seconds to achieve mixing of the components and then stopped. The course of the polymerization is observed. After 1 minute the mixture does not flow when the reaction vessel is held at a 40° angle (no flow time). After 3 minutes the solid mass starts to shrink away from the walls of the reaction vessel (total time). The solid polymer which is formed is light in color and tough.

The above procedure is repeated substituting an equimolar quantity of 2-dicyclohexylmethylene - 3 - phenyloxazolidine-4,5-dione for the 2-diphenylmethylene - 3-ethyloxazolidine-4,5-dione. Equivalent results are obtained.

The above procedure is repeated substituting an equimolar quantity of 2-(cyclohexylethyl)methylene-3-cyclohexyloxazolidone-4,5-dione for the 2-diphenylmethylene-3-ethyloxazolidine-4,5-dione. Equivalent results are obtained.

The above procedure is carried out substituting an equimolar amount of 2-cyclohexylidene-3-ethyloxazolidine-4,5-dione for the 2-diphenylmethylene-3-ethyloxazolidine-4,5-dione. Equivalent results are obtained.

*Example 2*

The procedure of Example 1 is followed substituting 0.1621 part of sodium methoxide for the sodium hydride and using 0.2346 part of the cocatalyst. The no flow time is 2 minutes and the total time for polymerization is 4 minutes. The relative viscosity of a 0.42% solution of the polymer in formic acid is 2.

*Example 3*

The procedure of Example 1 is repeated using 0.2940 part of 2-diethylmethylene-3-phenyloxazolidine-4,5-dione as the cocatalyst instead of the 2-diphenylmethylene-3-ethyloxazolidine-4,5-dione. The no flow time is 4 minutes and the total time is 5 minutes.

*Example 4*

The procedure of Example 3 is repeated using 0.2576 part of sodium hydride instead of 0.2016 part. The no flow time is 3 minutes and the total time is 5 minutes.

*Example 5*

The procedure of Example 1 is repeated using 0.2576 part of sodium hydride instead of 0.2016 part. The no flow time is 1 minute and the total time is 3 minutes.

The above procedure is repeated using 0.2367 part of 2-diethylmethylene-3-ethyloxazolidine - 4,5 - dione as the cocatalyst with equivalent results.

The above procedure is repeated using 0.2535 part of 2-diethylmethylene-3-isopropyloxazolidine - 4,5 - dione as the cocatalyst with equivalent results.

*Example 6*

The procedure of Example 1 is repeated using 0.03 part of cocatalyst and 0.138 part of sodium hydride as catalyst. The no flow time is 8 minutes and the total time 33 minutes.

The invention has been described by the foregoing. Many additional modifications will be obvious to those skilled in the art without departing from the inventive concept.

I claim:
1. In the process for the polymerization of lactams containing from 3 to 12 carbon atoms in the lactam ring to polyamides in the presence of a lactam-base salt prepared by heating from about 0.1 to 10 mole percent base with a lactam, the improvement which comprises carrying out said polymerization by adding from about 0.05 to 5 mole percent of a cocatalyst having the formula:

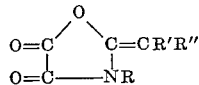

wherein R is a radical selected from the group consisting of alkyl, cycloalkyl and aryl radicals of up to 20 carbon atoms and R' and R" are radicals of up to 20 carbon atoms selected from the group consisting of alkyl, cycloalkyl and aryl radicals and cycloalkyl radicals containing both R' and R".

2. A process for the polymerization of a lactam containing from 3 to 12 carbon atoms in the lactam ring to a polyamide which comprises heating said lactam at a temperature above its melting point but below the melting point of the resulting polyamide in the presence of a lactam base salt prepared by heating from about 0.1 to 10 mole percent base with a lactam and adding from about 0.05 to 5 mole percent of a cocatalyst having the formula:

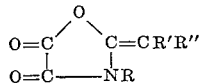

wherein R is a radical selected from the group consisting of alkyl, cycloalkyl and aryl hydrocarbon radicals of up to 20 carbon atoms and R' and R" are hydrocarbon radicals of up to 20 carbon atoms selected from the group consisting of alkyl, cycloalkyl and aryl radicals and cycloalkyl radicals containing both R' and R".

3. A process of claim 2 wherein R is an alkyl radical having 1 to 5 carbon atoms.
4. A process of claim 2 wherein said lactam is ε-caprolactam.
5. A process of claim 4 wherein said base is sodium hydride.
6. A process of claim 4 wherein said base is sodium methoxide.
7. A process of claim 2 wherein R' is an alkyl radical having 1 to 5 carbon atoms.
8. A process of claim 2 wherein R" is an alkyl radical having 1 to 5 carbon atoms.
9. In a process for the polymerization of caprolactam to polycaprolactam in the presence of a lactam-base salt prepared by heating from about 0.1 to 10 mole percent base with a lactam, the improvement which comprises carrying out said polymerization by adding from about 0.05 to 5 mole percent of a co-catalyst having the formula:

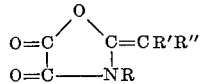

wherein R is a radical selected from the group consisting of alkyl, cycloalkyl and aryl radicals of up to 20 carbon atoms and R' and R" are radicals of up to 20 carbon atoms selected from the group consisting of alkyl, cycloalkyl and aryl radicals and cycloalkyl radicals containing both R' and R".

10. The process of claim 9 wherein the co-catalyst is diphenylmethylene-3-ethyloxazolidine-4,5-dione.
11. The process of claim 9 wherein the co-catalyst is diethylmethylene-3-phenyloxazolidine-4,5-dione.

References Cited by the Examiner
UNITED STATES PATENTS
3,017,391  1/62  Mottus et al. _____ 260—78
FOREIGN PATENTS
900,150  7/62  Great Britain.

WILLIAM H. SHORT, *Primary Examiner.*